United States Patent [19]

McLeod

[11] Patent Number: 5,002,101

[45] Date of Patent: Mar. 26, 1991

[54] HOSE DRAINING AND RECOVERY SYSTEM

[76] Inventor: Andrew McLeod, 6463 Lensen St., Philadelphia, Pa. 19119

[21] Appl. No.: 461,314

[22] Filed: Jan. 5, 1990

[51] Int. Cl.[5] .............................................. G01N 1/24

[52] U.S. Cl. .......................................... 141/83; 251/6; 15/104.008; 73/49,002 T; 73/46; 137/78.005; 222/108; 220/234; 220/243; 220/252; 141/94; 141/98; 141/86; 141/99

[58] Field of Search ....................... 141/83, 94, 98, 99, 141/100, 86, 192, 198, 311 A, 382; 137/78.5; 73/46, 49.2 T, 49.3; 220/324, 234, 247, 243, 252, 378; 15/104.08; 222/102; 251/6

[56] References Cited

U.S. PATENT DOCUMENTS

| | | | |
|---|---|---|---|
| 3,955,186 | 5/1976 | Green et al. | 137/78.5 X |
| 4,044,764 | 8/1977 | Szabo et al. | 222/102 X |
| 4,493,350 | 1/1985 | Beikel et al. | 141/192 X |
| 4,609,125 | 9/1986 | Willingham | 220/324 |
| 4,650,086 | 3/1987 | Morrison, Jr. | 220/66 |
| 4,767,021 | 8/1988 | Pies | 220/465 |

FOREIGN PATENT DOCUMENTS

| | | | |
|---|---|---|---|
| 3024199 | 1/1982 | Fed. Rep. of Germany | 137/78.5 |

*Primary Examiner*—Ernest G. Cusick
*Attorney, Agent, or Firm*—Terry M. Gernstein

[57] ABSTRACT

A system is used to completely drain a hose used in conjunction with a tanker truck or railroad tank car. The system includes a holding tank and a shutdown system as well as a hose emptying unit.

3 Claims, 3 Drawing Sheets

HOSE DRAINING AND RECOVERY SYSTEM

TECHNICAL FIELD OF THE INVENTION

The present invention relates to the general art of fluid handling devices, and to the particular field of hoses.

BACKGROUND OF THE INVENTION

Many tank trucks and railroad tank cars are filled with toxic liquid chemicals for transportation, storage and dispensing. These chemicals must be handled with extreme care if personnel and the environment are to be protected. Therefore, the art has numerous examples of safety devices for protecting such containers.

However, one portion of these liquid storage systems that is often overlooked is the conduit used to fill and dispense liquid to and from the containers. These conduits are fluidically connected to the container and to the destination system, and the fluid moves through such conduit. After use, many of these conduits are simply rolled up and stored. However, it is often the situation where some of the liquid remains in the conduit after completion of a filling or dispensing process. Since this fluid may be dangerous, it may present a hazard. This is especially so if the conduit is open at its dispensing end. The liquid or fumes associated with the liquid is thus free to permeate the environment surrounding the hose or the tank.

Neglecting the residue which may exist in a dispensing and filling hose not only may create a possibility of the just-discussed risk problems, it can also be wasteful of the liquid product since this product simply evaporates and is thus lost. Still further, leaving such a residue in the hose may, eventually, lead to damage or degradation of the hose itself.

Therefore, there is a need for a hose drainage system which will reliably drain liquid from a hose used in conjunction with a storage or transport tank, especially for toxic liquids, and will reliably contain not only the liquids but the gases associated with such liquids, and will fully drain the hose.

OBJECTS OF THE INVENTION

It is a main object of the present invention is to provide a hose drainage system.

It is another object of the present invention to provide a hose drainage system which will reliably drain liquid from a hose used in conjunction with a storage or transport tank.

It is another object of the present invention to provide a hose drainage system which will reliably drain liquid from a hose used in conjunction with a storage or transport tank, especially for toxic liquids.

It is another object of the present invention to provide a hose drainage system which will reliably drain liquid from a hose used in conjunction with a storage or transport tank, especially for toxic liquids, and will reliably contain not only the liquids but the gases associated with such liquids.

It is another object of the present invention to provide a hose drainage system which will reliably drain liquid from a hose used in conjunction with a storage or transport tank, especially for toxic liquids, and will reliably contain not only the liquids but the gases associated with such liquids, and will fully drain the hose.

SUMMARY OF THE INVENTION

These, and other, objects are achieved by a hose drainage system which includes a holding tank that can be tightly sealed in a manner that permits liquid to enter the holding tank and which prevents gases associated with the liquids from escaping from the tank. The system includes an alarm circuit that will signal the presence of escaping gases, and can be used to stop the hose draining process in such event. The system further includes a hose emptying unit that is used to squeeze a flexible conduit to ensure that all liquid is forced out of the hose into the holding tank.

In this manner, a hose used to fill or drain a liquid container can, itself, be fully drained in a manner that is both safe and effective to recoup any liquid left in the hose, along with any fumes which may be associated therewith.

BRIEF DESCRIPTION OF THE DRAWING FIGURES

DETAILED DESCRIPTION OF THE PREFERRED EMBODIMENT OF THE INVENTION

Figure 1:
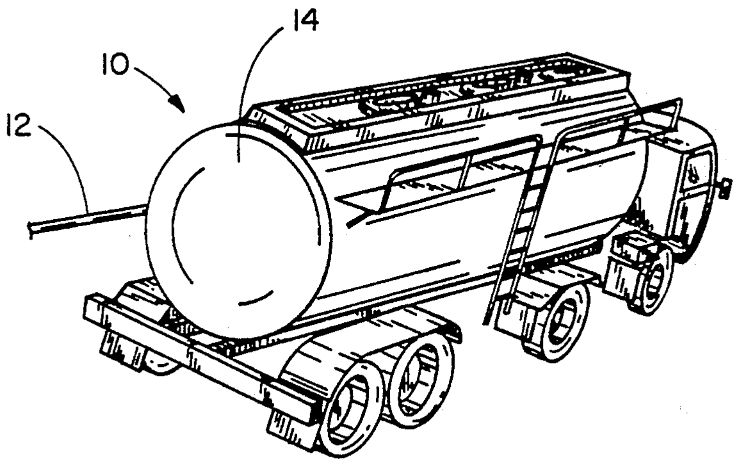
FIG. 1 is a perspective view of a tank truck which includes a hose to be emptied using the system embodying the present invention.

Shown in FIG. 1 is a tank truck 10 that is commonly used to transport and store liquids, including toxic liquids. The tank truck is loaded and unloaded via a conduit system that includes a hose 12. This hose is generally stored on the side of the truck, but is shown extended in FIG. 1 for the sake of description clarity. The hose is used to conduct fluid into the tank 14 of the truck, and is then stored during transport of the fluid, and is then deployed again at the destination to conduct fluid from the tank into appropriate storage facilities. A vent V can be included for use when desired.

As discussed above, liquid may remain in the hose after the initial filling of the tank 14, and may drain out onto a roadway or the like, and may also remain after the liquid has been dispensed from the tank. The liquid remaining in the hose may damage the hose, or create fumes that are undesirable, or may contaminate a future liquid product that is dispensed from the truck. In any event, it has been found to be undesirable to have liquid residue in many hoses associated with tank trucks and other vehicles used to store and transport liquid product. Therefore, the present invention is embodied in a system to ensure complete and safe draining of the hose 12.

Figure 2:
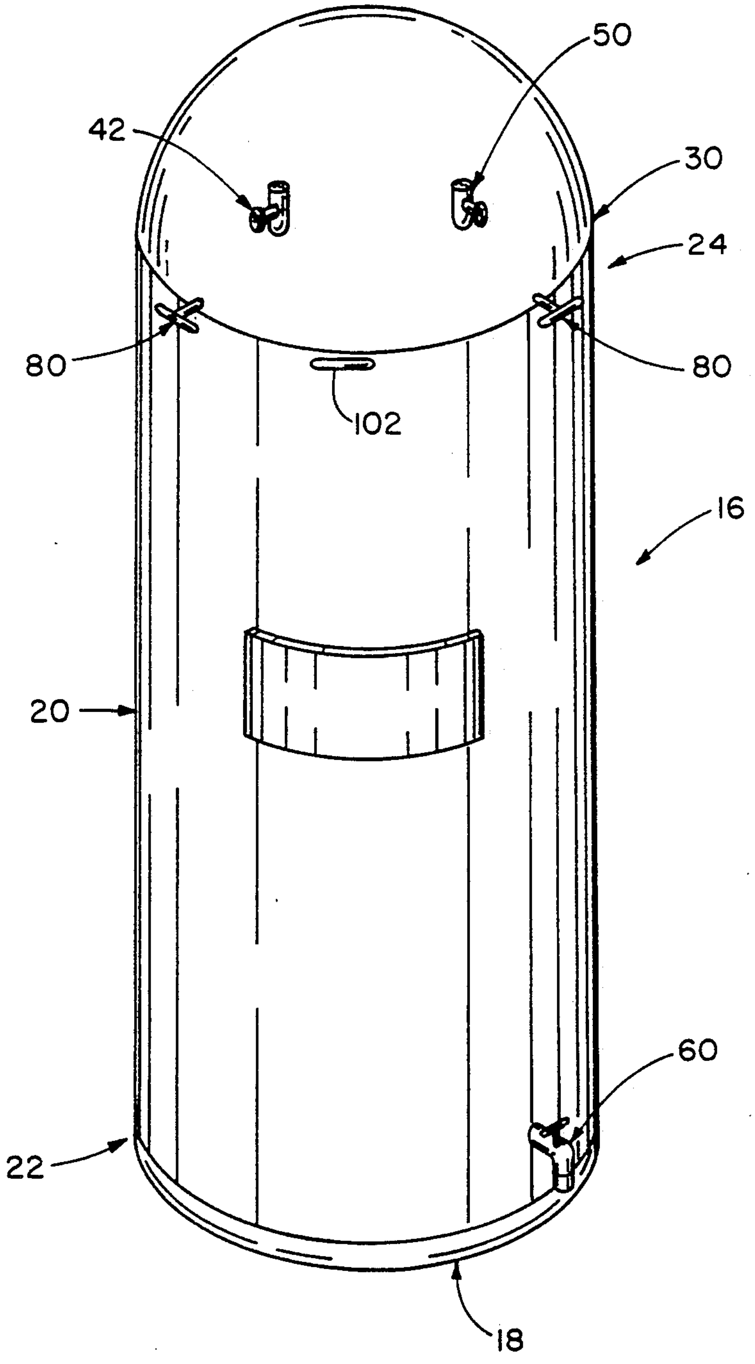
FIG. 2 is a perspective view of the holding tank used in the hose draining system of the present invention.
Figure 3:
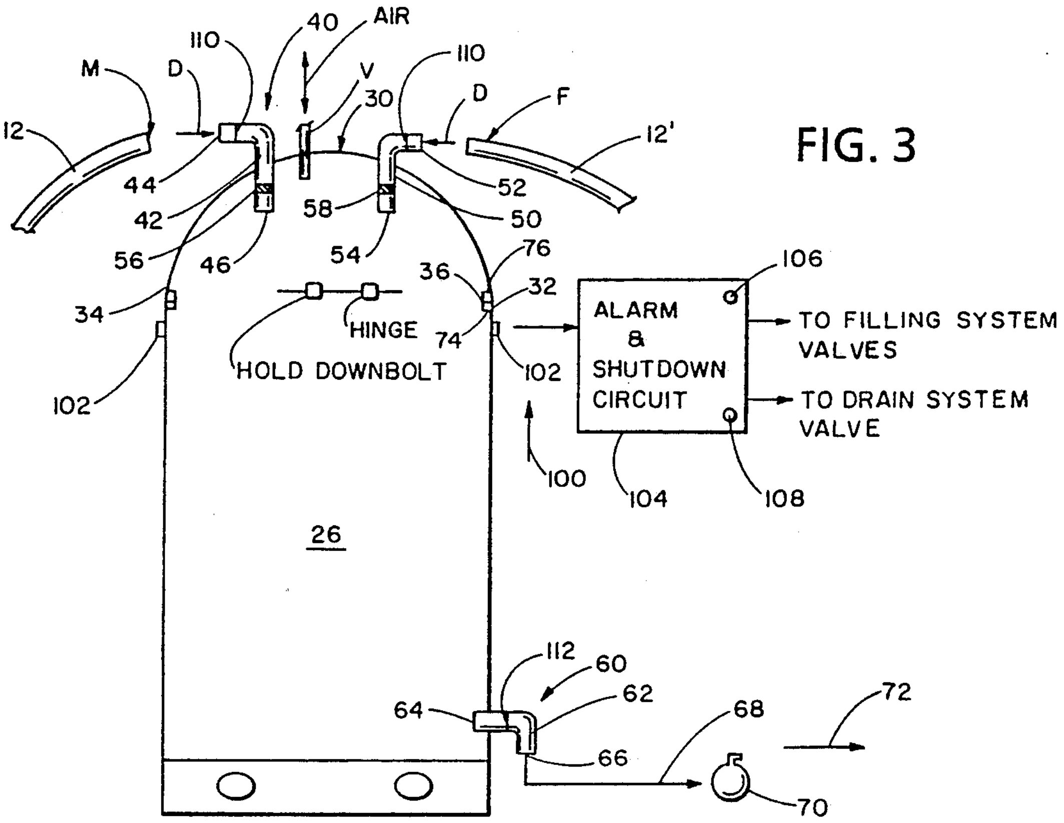
FIG. 3 is an elevational view of the holding tank.

The system includes a holding tank assembly 16 that is best shown in FIGS. 2 and 3. The holding tank assembly 16 includes a weighted base 18 that includes lead weights or the like so that the assembly is stable in an upright condition as shown in FIGS. 2 and 3, even when there is liquid inside of the assembly.

The assembly further includes a monolithic, one-piece body 20 mounted at a lower end 22 thereof to the base to extend upwardly therefrom to an upper end 24 thereof. The body is cylindrical and hollow to define a liquid containing chamber 26 therein. The monolithic, one-piece nature of the body ensures integrity of the assembly.

A monolithic, one-piece domed top element 30 is hemispherical in shape and includes lower rim 32 that rests on an upper rim 34 of the body 20. The monolithic, one-piece nature of domed top also ensures the integrity of the assembly.

The top element 30 is attached to the body by a gasket seal unit 36 to close the liquid containing chamber 26.

The system also includes a filling system 40 that is fluidically connected to the hose that is being drained, as indicated in FIG. 3 at 12 and 12', with hose 12 having a male connection M that is attached to the system, and hose 12' having a female connection F that is attached to the system. Fluid from the hoses moves into the system in the directions indicated in FIG. 3 by the arrows D.

The system 40 also includes a male connection valve element 42 mounted on the domed top 30 to have an inlet end 44 that is adapted to fluidically couple to the male hose connector M and an outlet end 46 located inside the holding tank. A female hose connection valve 50 is also mounted on the domed top element and includes an inlet end 52 that is adapted to fluidically couple to the female hose connection element F and an outlet end 54 located inside the tank.

Each of the valves 42 and 50 also includes a semi-permeable membrane 56 and 58 respectively fluidically interposed between the inlet and the outlet ends of the valve. This semi-permeable membrane is of the type that permits fluid to pass from the inlet of the valve to the outlet of that valve, but which prevents gases associated with such fluid from passing from the outlet to the inlet of the valve. Such membranes are well known to those skilled in the chemical arts, and thus will not be discussed in great detail, it being understood that such skilled artisans will be able to select such a membrane based on the teaching of this disclosure.

Fluid is drained from the tank via a drain system 60 which includes a drain valve 62 having an inlet end 64 located inside the tank and an outlet end 66 that is fluidically and sealingly connected to a conduit 68 that is part of a pump system having a pump 70 for moving the fluid and fumes to a suitable disposal site as indicated by arrow 72.

Figure 4:
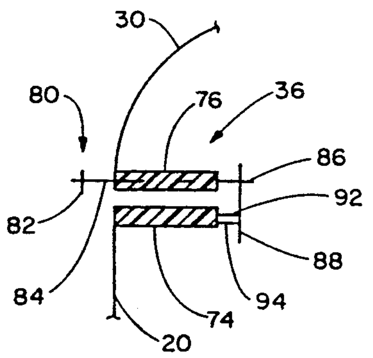
FIG. 4 illustrates a portion of a seal used in the holding tank.
Figure 5:
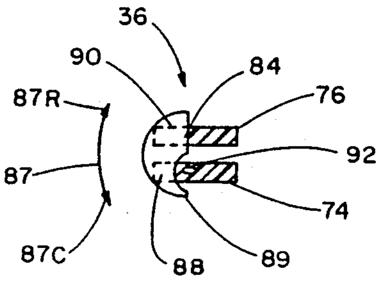
FIG. 5 illustrates a gasket sealing unit used in the holding tank.

The gasket seal unit 36 is best shown in FIGS. 4 and 5 as including a first elastomeric gasket 74 on the body 20 in circumambient relation to the top edge of the body and a second elastomeric gasket 76 on the domed top element 30 in circumambient relation to the lower edge of that domed top element. The two gaskets 74 and 76 are located inside the container and in facing, abutting relation with each other. When the domed top element is located on top of the body, the gaskets are in face-to-face abutting relation with each other as is indicated in FIG. 4. The gaskets are held together by gravity forcing the domed top element against the body.

However, to fully ensure against the escape of fumes from the tank via the seal 36, the assembly 10 further includes a plurality of lock pin assemblies, such as lock pin assembly 80 shown in FIGS. 4 and 5.

Each lock pin assembly includes a hand grip element 82 located outside of the tank, and affixed to a body 84 that extends through the domed top element and through the second seal 76 to have a distal end 86 located inside of the tank. The body 84 is rotatable about its longitudinal centerline as indicated in FIG. 5 by double-headed arrow 87. A crescent shaped catch element 88 is mounted on the body 84 for rotation therewith. The crescent shaped element includes a thin end 89 and a thick end 90 and is attached to the body 84 near the thick end to force the thin end toward and away from the gasket 74 as the handle is rotated.

A lock pin 92 is fixedly mounted on the body 20 and extends through the gasket 74 to have a distal end 94 located to be captured by the crescent shaped element thin end 89 as that element is rotated in the direction 87C, and to be released as the element 88 is rotated in the direction 87R. The crescent shape of the element will cause the pin 92 to be drawn towards the handle body 84 as the handle is rotated in direction 87C. The desired degree of tightness for the seal between the gaskets 74 and 76 can be established by the amount of rotation of the handle 82.

To further ensure the integrity of the overall system, the system includes an operation shutdown system 100, best indicated in FIG. 3. The shutdown system 100 stops the hose draining process in the event that noxious fumes are sensed in the vicinity of the tank and sounds an alarm so that the environment and personnel are protected against exposure to fumes that might be harmful.

The shutdown system 100 includes a chemically sensitive electronic transducer 102 located on the tank body adjacent to the seal. Chemically sensitive transducers are fully discussed in basic textbooks, such as "Handbook of Modern Electronics and Electrical Engineering", edited by Charles Brelove and published by Wiley Interscience in 1986, and the disclosure thereof is incorporated herein by reference. The transducer 102 generates a signal upon sensing fumes and such signal is appropriately amplified and sent to an alarm and shutdown circuit 104. The circuit 104 is connected to a visible alarm 106 and an audible alarm 108 and is connected to the valves 42 and 50 to shut those valves off upon the sensing of fumes from the seal. Suitable shutoff valve elements 110, such as butterfly valves, are inserted in each of the valves 42 and 50 to be closed by the circuit 104. The circuit is also connected to a shutdown valve 112 in the drain system 60 to close off that system as well. The circuit has sensing means that prevent the shutdown of the drain system 60 until the filling system 40 is shut down.

Figure 6:
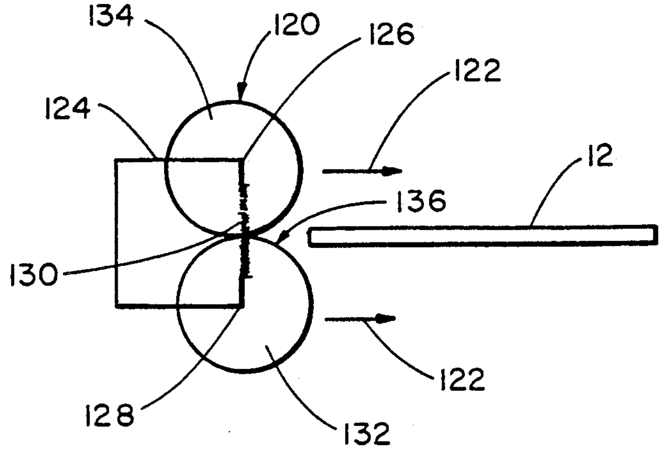
FIG. 6 illustrates a hose emptying unit used in the system of the present invention.

The system 10 further includes a hose emptying unit 120, best shown in FIG. 6, for ensuring that the hose is fully empty. This unit is forced along the hose in the longitudinal direction towards the tank after the hose has been fluidically connected to the tank. The unit squeezes the hose and forces liquid in the hose towards the tank as the unit is moved towards the tank as indicated in FIG. 6 by arrows 122. The unit 120 includes a frame 124 having two axles 126 and 128 oriented in parallel relation to each other. The axles are biased toward each other by a strong spring element 130, and two rollers 132 and 134 are rotatably mounted on the axles to contact each other and form a nip 136 into which the hose 12 is fed to be pressed by the rollers 132 and 134.

It is understood that while certain forms of the present invention have been illustrated and described herein, it is not to be limited to the specific forms or arrangements of parts described and shown.

I claim:

1. A hose draining and recovery system comprising:

(A) a hollow holding tank assembly which includes (1) a weighted base, (2) a monolithic, one-piece cylindrical body attached to said base, said body having a bottom and an upper end, (3) a monolithic, one-piece domed top element attached to said base upper end, (4) a gasket seal unit sealingly connecting said domed top element to said body to define a tank interior portion, said seal unit including a first gasket on said domed top, a second gasket on said body and a plurality of locking pin units on said first and second gaskets, said first gasket and said second gasket being in abutting contact with each other when said top element is on said body;

(B) a filling system which includes (1) a male connection hose, (2) a female connection hose, (3) a male connection valve mounted on said domed top element and fluidically connected to the tank interior portion and which is connected to said male connection hose, (4) a female connection valve mounted on said domed top element and fluidically connected to the interior portion and which is connected to said female connection hose, (5) a first semipermeable membrane in said male connection valve which permits liquid to pass into said holding tank via said male connection valve and which prevents gas from passing out of said holding tank via said male connection valve, and (6) a second semipermeable membrane in said female connection valve which permits liquid to pass into said holding tank via said female connection valve and which prevents gas from passing out of said holding tank via said female connection valve;

(C) a drain system which includes (1) a drain valve fluidically connected to said holding tank near said bottom, (2) a pump fluidically connected to said drain valve, and (3) a drain hose fluidically connected to said drain valve; and (D) a hose emptying unit for mounting on said male connection hose and on said female connection hose and which includes (1) a frame, (2) two rollers mounted on said frame to contact each other, said rollers forming a nip through which one of said male or said female connection hoses fits to be squeezed as said frame is moved along said male connection hose or along said female connection hose toward said holding tank, and (3) a spring element biasing said rollers together; and (E) an operation shutdown system which includes (1) a chemically sensitive electronic transducer mounted on said body adjacent to said gasket seal unit, (2) an alarm and shutdown circuit means connected to said transducer and to said filling system and to said drain system to close all of said filing and drain system valves upon said transducer sensing fumes from said gasket unit.

2. The hose draining and recovery system defined in claim 1 wherein said gasket seal unit includes a first elastomeric seal element on said body and a second elastomeric seal element on said top element.

3. The hose draining and recovery system defined in claim 2 wherein each of said plurality of locking pin units includes (a) a pin fixedly mounted on said body to extend through said seal unit into said tank interior portion to have a distal end located in said tank interior portion, (b) a hand grip element on said top and located outside of said tank interior when said domed top element is located on said body, (c) a handle body connected to said hand grip element and rotatably mounted on said body to extend through said first seal element to have a distal end located inside of said tank interior, (d) a crescent shaped catch element mounted on said handle body distal end for rotation with said handle body, and located to contact said pin to pull said pin towards said handle body as said hand grip element is rotated in a first direction, and to release said pin when said hand grip element is rotated in an opposite direction.

* * * * *